US008012633B2

(12) United States Patent
Gordon et al.

(10) Patent No.: US 8,012,633 B2
(45) Date of Patent: Sep. 6, 2011

(54) ADVANCED METAL-AIR BATTERY HAVING A CERAMIC MEMBRANE ELECTROLYTE

(75) Inventors: John Howard Gordon, Salt Lake City, UT (US); Shekar Balagopal, Sandy, UT (US); Sai Bhavaraju, West Jordan, UT (US); John Joseph Watkins, West Jordan, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 811 days.

(21) Appl. No.: 11/871,824

(22) Filed: Oct. 12, 2007

(65) Prior Publication Data

US 2008/0268327 A1    Oct. 30, 2008

Related U.S. Application Data

(60) Provisional application No. 60/829,499, filed on Oct. 13, 2006.

(51) Int. Cl.
*H01M 12/06*    (2006.01)
(52) U.S. Cl. .................. 429/405; 429/101; 429/480
(58) Field of Classification Search ............ 429/27, 429/101, 29, 33, 403, 405, 480, 482, 491
See application file for complete search history.

(56) References Cited

U.S. PATENT DOCUMENTS

| | | |
|---|---|---|
| 1,501,756 A | 7/1924 | Downs |
| 3,660,170 A | 5/1972 | Rampel |
| 3,785,965 A | 1/1974 | Welty |
| 3,787,315 A | 1/1974 | Bearden, Jr. et al. |
| 3,788,978 A | 1/1974 | Bearden, Jr. et al. |
| 3,791,966 A | 2/1974 | Bearden |
| 3,970,472 A | 7/1976 | Steffensen |
| 4,053,371 A | 10/1977 | Towsley et al. |
| 4,076,613 A | 2/1978 | Bearden, Jr. |
| 4,207,391 A | 6/1980 | Church et al. |
| 4,298,666 A | 11/1981 | Taskier |
| 4,307,164 A | 12/1981 | Church et al. |
| 4,372,823 A | 2/1983 | Church et al. |
| 4,479,856 A | 10/1984 | Ando |
| 4,542,444 A | 9/1985 | Boland |
| 4,623,597 A | 11/1986 | Sapru et al. |
| 4,842,963 A | 6/1989 | Ross, Jr. et al. |
| 5,057,206 A | 10/1991 | Engel et al. |
| 5,213,908 A * | 5/1993 | Hagedorn ................ 429/29 X |

(Continued)

OTHER PUBLICATIONS

Young, Lee W., "International Search Report", PCT Search Report for App. No. PCT/US 07/21978, (Oct. 10, 2008),1-2.

(Continued)

*Primary Examiner* — Stephen J. Kalafut
(74) *Attorney, Agent, or Firm* — David Fonda (57) ABSTRACT

A metal-air battery is disclosed in one embodiment of the invention as including a cathode to reduce oxygen molecules and an alkali-metal-containing anode to oxidize the alkali metal (e.g., Li, Na, and K) contained therein to produce alkali-metal ions. An aqueous catholyte is placed in ionic communication with the cathode to store reaction products generated by reacting the alkali-metal ions with the oxygen containing anions. These reaction products are stored as solutes dissolved in the aqueous catholyte. An ion-selective membrane is interposed between the alkali-metal containing anode and the aqueous catholyte. The ion-selective membrane is designed to be conductive to the alkali-metal ions while being impermeable to the aqueous catholyte.

20 Claims, 5 Drawing Sheets

U.S. PATENT DOCUMENTS

| | | | |
|---|---|---|---|
| 5,290,405 A | 3/1994 | Joshi et al. | |
| 5,516,598 A | 5/1996 | Visco et al. | |
| 5,580,430 A | 12/1996 | Balagopal et al. | |
| 5,695,632 A | 12/1997 | Brons et al. | |
| 5,780,186 A | 7/1998 | Casey, Jr. | |
| 5,856,047 A | 1/1999 | Venkatesan et al. | |
| 5,882,812 A | 3/1999 | Visco et al. | |
| 5,935,421 A | 8/1999 | Brons et al. | |
| 6,017,651 A | 1/2000 | Nimon et al. | |
| 6,025,094 A | 2/2000 | Visco et al. | |
| 6,030,720 A | 2/2000 | Chu et al. | |
| 6,110,236 A | 8/2000 | Tsang et al. | |
| 6,153,328 A | 11/2000 | Colborn | |
| 6,159,634 A | 12/2000 | Yen et al. | |
| 6,165,644 A | 12/2000 | Nimon et al. | |
| 6,200,704 B1 | 3/2001 | Katz et al. | |
| 6,210,564 B1 | 4/2001 | Brons et al. | |
| 6,210,832 B1 | 4/2001 | Visco et al. | |
| 6,214,061 B1 | 4/2001 | Visco et al. | |
| 6,225,002 B1 | 5/2001 | Nimon et al. | |
| 6,248,476 B1 * | 6/2001 | Sun et al. | 429/29 X |
| 6,248,481 B1 | 6/2001 | Visco et al. | |
| 6,265,100 B1 | 7/2001 | Saaski et al. | |
| 6,291,090 B1 * | 9/2001 | Kuznetsov et al. | 429/403 X |
| 6,310,960 B1 | 10/2001 | Saaski et al. | |
| 6,358,643 B1 | 3/2002 | Katz et al. | |
| 6,368,486 B1 | 4/2002 | Thompson et al. | |
| 6,402,795 B1 | 6/2002 | Chu et al. | |
| 6,413,284 B1 | 7/2002 | Chu et al. | |
| 6,413,285 B1 | 7/2002 | Chu et al. | |
| 6,416,903 B1 | 7/2002 | Fierro et al. | |
| 6,432,584 B1 | 8/2002 | Visco et al. | |
| 6,537,701 B1 | 3/2003 | Nimon et al. | |
| 6,610,440 B1 | 8/2003 | LaFollette et al. | |
| 6,632,573 B1 | 10/2003 | Nimon et al. | |
| 6,737,197 B2 | 5/2004 | Chu et al. | |
| 6,787,019 B2 | 9/2004 | Jacobson et al. | |
| 6,852,450 B2 | 2/2005 | Hwang et al. | |
| 6,881,234 B2 | 4/2005 | Towsley | |
| 6,911,280 B1 | 6/2005 | De Jonghe et al. | |
| 6,955,753 B1 | 10/2005 | Gomez | |
| 6,955,866 B2 | 10/2005 | Nimon et al. | |
| 6,991,662 B2 | 1/2006 | Visco et al. | |
| 7,070,632 B1 | 7/2006 | Visco et al. | |
| 7,144,654 B2 | 12/2006 | LaFollette et al. | |
| 7,166,384 B2 | 1/2007 | LaFollette et al. | |
| 7,214,443 B2 | 5/2007 | Clarke et al. | |
| 7,259,126 B2 | 8/2007 | Gordon et al. | |
| 7,282,295 B2 | 10/2007 | Visco et al. | |
| 7,282,296 B2 | 10/2007 | Visco et al. | |
| 7,282,302 B2 | 10/2007 | Visco et al. | |
| 7,390,591 B2 | 6/2008 | Visco et al. | |
| 7,432,017 B2 | 10/2008 | Visco et al. | |
| 7,482,096 B2 | 1/2009 | De Jonghe et al. | |
| 7,491,458 B2 | 2/2009 | Visco et al. | |
| 2002/0150818 A1 | 10/2002 | Amatucci et al. | |
| 2004/0229107 A1 | 11/2004 | Smedley | |
| 2005/0109617 A1 | 5/2005 | Ono et al. | |
| 2005/0175894 A1 | 8/2005 | Visco et al. | |
| 2006/0096893 A1 | 5/2006 | De Almeida et al. | |
| 2006/0141346 A1 | 6/2006 | Gordon et al. | |
| 2006/0177732 A1 | 8/2006 | Visco et al. | |
| 2006/0257734 A1 | 11/2006 | Obata et al. | |
| 2007/0048610 A1 | 3/2007 | Tsang | |
| 2007/0172739 A1 | 7/2007 | Visco et al. | |
| 2008/0268327 A1 | 10/2008 | Gordon et al. | |
| 2009/0061288 A1 | 3/2009 | Gordon et al. | |
| 2009/0136830 A1 | 5/2009 | Gordon | |

OTHER PUBLICATIONS

Young, Lee W., "Written Opinion of the International Searching Authority", *PCT/US 07/21978* (Oct. 10, 2008),1-5.

Young, Lee W., "International Search Report", PCT Search Report for App. No. PCT/US 08/10435, (Nov. 25, 2008),1-2.

Young, Lee W., "Written Opinion of the International Searching Authority", PCT Written Opinion for App. No. PCT/US 08/10435, (Nov. 25, 2008),1-4.

Fu, "Effects of M3+ Ions on the Conductivity of Glasses and Glass-ceramics in the system Li2O-M2O3-GeO2-P2O5 (M=Al, Ga, Y, Dt, Gd, and La)", *Communications of the American Ceramic Society*, vol. 83, No. 4, (Apr. 2000),104-106.

Thokchom, et al., "Superionic Conductivity in a Lithium Aluminum Germanium Phosphate Glass-Ceramic", *Journal of the Electrochemical Society*, 155 (12), (Oct. 8, 2008),A915-A920.

Fu, "Fast Li+ Ion Conducting Glass Ceramics in the System Li2O-Al2O3-TiO2-P2O5", *Science Direct, Solid State Ionics*, vol. 104, Issues 3-4, (Dec. 11, 1997),191-194.

Saienga, et al., "The Comparative Structure, Property, and Ionic Conductivity of LiI+Li2S+GeS2 Glasses Doped with Ga2S3 and La2S3", *Journal of Non-Crystalline Solids*, vol. 354, 14, (Mar. 1, 2008),Abstract.

Wang, et al., "Polymer Composite Electrolytes Containing Active Mesoporous SiO2 Particles", *Journal of Applied Physics*, 102, (2007),1-6.

Wang, et al., "Li1.3Al0.3Ti1.7(PO4)3 Filler Effect on (PEO)LiClO4 Solid Polymer Electrode", *Department of Materials Science and Engineering, Zhejiang University*, (2004),Abstract.

Balagopal, et al., "Selective sodium removal from aqueous waste streams with NaSICON ceramics", *Separation and Purification Technology*, 15, (1999), 231-237.

Dissanayake, et al., "Lithium ion conducting $Li_{4-2x}Ge_{1-x}S_xO_4$ solid electrolytes", *Solid State Ionics*, 62, (1993), 217-223.

Dissanayake, et al., "New solid electrolytes and mixed conductors: $Li_{3+x}Cr_{1-x}M_xO_4$: M=Ge, Ti", *Solid State Ionics*, 76, (1995), 215-220.

Kerr, "Polymeric Electrolytes: An Overview", *Lithium Batteries: Sciences and Technology*, Chapter 19, edited by Nazri and Pistoia, Kluwer Academic Publishers, (2004), 574-622.

Kowalczk, et al., "Li-air batteries: A classic example of limitations owing to solubilities", *Pure Appl. Chem.*, vol. 79, No. 5, (2007), 851-860.

Panero, et al., "High Voltage Lithium Polymer Cells Using a PAN-Based Composite Electrolyte", *J. Electrochem. Soc.*, vol. 149, No. 4, (2002), A414-A417.

Read, "Characterization of the Lithium/Oxygen Organic Electrolyte Battery", *J. Electrochem. Soc.*, vol. 149, No. 9, (2002), A1190-A1195.

Sagane, et al., "$Li^+$ and $Na^+$ transfer through interfaces between inorganic solid electrolytes and polymer or liquid electrolytes", *Journal of Power Sources*, 146, (2005), 749-752.

Sumathipala, et al., "Novel Li+ Ion Conductors and Mixed Conductors, $L_{i3+x}Si_xCr_{1-x}O_4$ and a Simple Method for Estimating $Li^+/e^-$ Transport Numbers", *J. Electrochem. Soc.*, vol. 142, No. 7, (Jul. 1995), 2138-2143.

Wang, et al., "$LiTi_2(PO_4)_3$ with NASICON-type structure as lithium-storage materials", *Journal of Power Sources*, 124, (2003), 231-236.

Goodenough, J.B. et al., "Fast Na+ -Ion Transport in Skeleton Structures", *Mat. Res. Bull.*, vol. 11, Pergamon Press, Inc. Printed in the United States,(1976),203-220.

Hong, H.Y-P. et al., "Crystal Structures and Crystal Chemistry in the System Na1+xZr2SixP3−x012", *Mat. Res. Bull.*, vol. 11, 1976. Pergamon Press, Inc. Printed in the United States.,(1976),173-186.

Bentzen, J. J., et al., "The preparation and characterization of dense, highly conductive Na5GdSi4O12 nasicon (NGS)", *Materials Research Bulletin*, vol. 15,(1980),1737-1745.

Delmas, C. et al., "Crystal chemistry of the Na1+xZr2−xLx(PO4)3 (L=Cr, In, Yb) solid solutions", *Materials Research Bulletin*, vol. 16,(1981),285-290.

Von Alpen, V. et al., "Compositional dependence of the electrochemical and structural parameters in the NASICON system (Na1+sSixZr2P3−xO12)", *Solid State Ionics*, vol. 3/4,(1981),215-218.

Fujitsu, S. et al., "Conduction paths in sintered ionic conductive material Na1+xYxZr2−x(PO4)3", *Materials Research Bulletin*, vol. 16,(1981),1299-1309.

Saito, Y. et al., "Ionic Conductivity of NASICON-type conductors Na1.5M0.5Zr1.5(PO4)3 (M: Al3+, Ga3+, Cr3+, Sc3+, Fe3+, In3+, Yb3+, Y3+)", *Solid State Ionics*, vol. 58,(1992),327-331.

Alamo, J. "Chemistry and properties of solids with the [NZP] skeleton", *Solid State Ionics*, vol. 63-65, vol. 63-85,(1993),547-561.

Shimazu, K. et al., "Electrical conductivity and Ti4+ ion substitution range in NASICON system", *Solid State Ionics*, vol. 79, (1995),106-110.

Miyajima, Y. et al., "Ionic conductivity of NASICON-type Na1+xMxZr2−xP3O12(M: Yb, Er, Dy)", *Solid State Ionics*, vol. 84,(1996),61-64.

Manickam, Minakshi et al., "Lithium insertion into manganese dioxide electrode in MnO2/Zn aqueous battery Part I. A preliminary study", *Journal of Power Sources*, vol. 130, Issues 1-2 (Obtained through ScienceDirect),(May 2004),254-259.

Kim, "International Search Report", International App. No. PCT/US2008/084707, (Apr. 29, 2009),1-3.

Kim, "Written Opinion of the International Searching Authority", International App. No. PCT/US2008/084707, (Apr. 29, 2009),1-4.

Park, Jin "Written Opinion of the International Searching Authority Mailed on Jun. 30, 2009", Int. App. No. PCT/US2008/084572, 1-3.

Park, Jin "International Search Report Mailed on Jun. 30, 2009", Int. App. No. PCT/US2008/084572, 1-3.

Kim, Jun Hak "Written Opinion of the International Searching Authority Mailed on Aug. 24, 2009", Int. App. No. PCT/US2009/032458, 1-4.

Kim, Jun Hak "International Search Report Mailed on Aug. 24, 2009", Int. App. No. PCT/US2009/032458, 1-3.

* cited by examiner

ADVANCED METAL-AIR BATTERY HAVING A CERAMIC MEMBRANE ELECTROLYTE

RELATED APPLICATIONS

This application claims the benefit of to U.S. Provisional Patent No. 60/829,499 filed on Oct. 13, 2006 and entitled ADVANCED LITHIUM BATTERIES BASED ON CERAMIC MEMBRANE ELECTROLYTE.

U.S. GOVERNMENT INTEREST

This invention was made with government support under Contract No. W91 QX-06-C-0092 awarded by the U.S. Army. This invention was also made with government support under Contract No. W9QX-06-C-0058 awarded by the U.S. Army. The government has certain rights in the invention.

FIELD OF THE INVENTION

This invention relates to batteries and more particularly to apparatus and methods for improving the performance of metal-air batteries.

DESCRIPTION OF THE RELATED ART

Our society has come to rely on batteries to power a myriad of devices, including computers, cell phones, portable music players, lighting devices, as well as many other electronic components. Nevertheless, there is an ongoing need for further advances in battery technology. For example, there is currently a tremendous push to develop economical batteries that can be used by automobiles and other vehicles to reduce reliance on fossil fuels and reduce the output of carbon emissions. Furthermore, the "information age" increasingly demands portable energy sources that provide lighter weight, higher energy, longer discharge times, and smaller customized designs. To achieve these advances, technologists continue to work to develop batteries with higher and higher specific energies and energy densities while still providing acceptable safety, power densities, cost, and other needed characteristics.

Metal-air batteries have many applications and advantages that give them a potential edge over many other types of batteries. Theoretically, for example, a lithium-air battery has a higher energy density than virtually all other types of practical battery technologies, including lithium-ion batteries. If lithium-air batteries can be improved significantly, they may provide dramatically improved specific energy, energy density and cost compared to many primary and secondary battery technologies, including lithium-ion secondary batteries. An improved lithium-air battery would be highly beneficial in military, consumer, and many other battery applications.

Advantages of lithium-air batteries include their lower material and manufacturing costs compared to their lithium-ion counterparts. Lithium-air batteries may also be lighter weight, store more energy, have longer discharge times, and have a reduced size compared to conventional lithium-ion batteries. Because of these characteristics, lithium-air batteries (and other metal-air batteries) may have a unique opportunity in many battery markets.

Conventional lithium-air batteries typically include a porous membrane (i.e., a lithium-ion conductive solid polymer electrolyte membrane) interposed between a lithium metal foil anode and a thin carbon composite cathode. The porous membrane permits a non-aqueous electrolyte (e.g., ethylene carbonate, propylene carbonate, etc.) to pass through the membrane while preventing the flow of electrons through the membrane. Oxygen, the electro-active cathode material in the battery, is reduced on the carbon composite cathode during discharge of the battery. Upon discharge, lithium ions and peroxide ions in the battery combine together to generate one or more reaction products (lithium hydroxide, lithium peroxide, etc.) at or near the cathode of the battery.

Nevertheless, conventional lithium-air batteries, like many other battery technologies, are hindered by various limitations. The reaction products (i.e., lithium hydroxide, lithium peroxide, etc.) tend to clog up the pores of the cathode and limit the movement of reactants, significantly limiting the life of the battery.

Unlike the non-aqueous air cathode that is not capable of attaining high current density, an air cathode in communication with an aqueous catholyte is capable of very high current density. For example, Gordon et al., in U.S. Pat. No. 7,259,126 disclosed an excellent oxygen cathode which when exposed to 50% NaOH and oxygen partial pressure of 0.85 atmospheres was able to attain 500 mA/cm$^2$ with only 350 mV polarization. Likewise, the manufacturer, Electric-Fuel shows on their website polarization data for their air cathode in 8.5M KOH and air where the air cathode had less than 600 mV polarization at 300 mA/cm$^2$.

In view of the foregoing, what is needed is an improved metal-air battery that is capable of overcoming one or more of the previously mentioned limitations. Specifically, a membrane is needed that will enable the utilization of an aqueous air cathode that will enable the utilization of a metal-air battery that will reduce or prevent the cathode from becoming clogged with various reaction products.

SUMMARY OF THE INVENTION

The present invention has been developed in response to the present state of the art, and in particular, in response to the problems and needs in the art that have not yet been fully solved by currently available metal-air batteries.

Consistent with the foregoing and in accordance with the invention as embodied and broadly described herein, a metal-air battery is disclosed in one embodiment of the invention as including a cathode to reduce oxygen molecules and an anode to oxidize an alkali metal (e.g., Li, Na, or K) contained therein to produce alkali-metal ions. An aqueous catholyte is placed in electrical communication with the cathode. An ion-selective membrane is interposed between the alkali-metal-containing anode and the aqueous catholyte. The ion-selective membrane is designed to be conductive to the alkali-metal ions while being impermeable to the aqueous catholyte.

In selected embodiments, the battery further includes an anolyte interposed between the alkali-metal-containing anode and the ion-selective membrane to conduct the alkali-metal ions from the anode to the ion-selective membrane. In certain embodiments, the aqueous catholyte is a separator material soaked in an aqueous catholyte solution. The aqueous catholyte may be used to store reaction products, such as alkali-metal hydroxides or oxides, and their respective hydrates produced at or near the cathode or in the catholyte.

In certain embodiments, the ion-selective membrane may include a monolith of dense layer, a dense layer sandwiched between porous layers. The dense layer may be fabricated from an ionically conductive material, such as LiSICON, NaSICON, or other suitable ceramic appropriate to the anode material that is also impermeable to the aqueous catholyte. The porous layers, in selected embodiments, may provide structural integrity and rigidity to the dense layer. In certain embodiments, these porous layers may be infiltrated with the anolyte and catholyte, respectively, in order to provide ionic conductivity between the dense layer, and the anolyte and catholyte, respectively.

In selected embodiments, the cathode may be a multi-layer structure. For example, in certain embodiments, the cathode may include a gas-diffusion layer that is hydrophobic but is permeable to oxygen. This may allow oxygen to enter the battery while preventing the aqueous catholyte from leaking out of the battery. A reaction layer may be placed adjacent to the gas-diffusion layer to reduce the oxygen molecules passing through the gas-diffusion layer. In selected embodiments, the reaction layer may contain or be infiltrated with a catalyst to aid in reducing the oxygen. In certain embodiments, this catalyst may include a perovskite-type compound. In other embodiments, this catalyst may include a manganese, cobalt and oxides thereof. In other embodiments, the reaction layer may also include an oxygen evolution catalyst to make the battery rechargeable.

In another aspect of the invention, a method in accordance with the invention includes generating alkali-metal ions at an anode and transporting the alkali-metal ions through an ion-selective membrane that is impermeable to water. The method may further include transporting the alkali-metal ions through an aqueous catholyte solution. These alkali-metal ions may be reacted with oxygen or hydroxyl ions generated at a cathode to produce a reaction product, such as an alkali-metal hydroxide or oxide. These reaction products may then be stored as solutes dissolved in the aqueous catholyte solution and later precipitated over the course of discharge in the catholyte contained between separator and cathode.

In yet another aspect of the invention, a metal-air battery in accordance with the invention includes a cathode to reduce oxygen molecules to produce peroxide or hydroxyl ions and an alkali-metal-containing anode to oxidize the alkali metal contained therein to produce alkali-metal ions. A catholyte solution is placed in electrical communication with the cathode to conduct the alkali-metal ions. An ion-selective membrane is interposed between the alkali-metal containing anode and the catholyte solution. This ion-selective membrane is conductive to the alkali-metal ions while being impermeable to the catholyte solution. The catholyte solution is designed to store, in the form of a dissolved solute, reaction products formed by reacting the peroxide or hydroxyl ions and the alkali-metal ions.

The present invention provides an improved metal-air battery that overcomes various limitations of conventional metal-air batteries. The features and advantages of the present invention will become more fully apparent from the following description and appended claims, or may be learned by practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
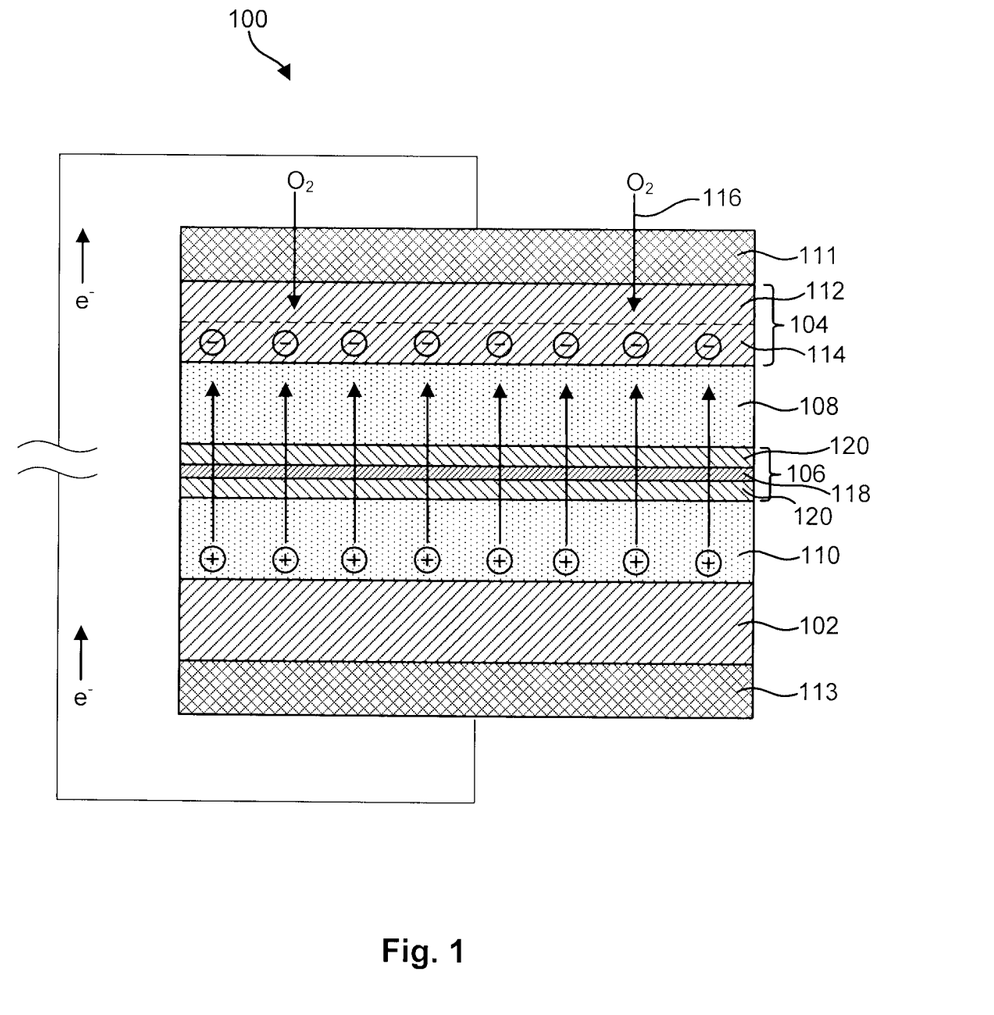
FIG. 1 is a high-level block diagram showing one embodiment of a metal-air battery in accordance with the invention.

Referring to FIG. 1, in general, a metal-air battery 100 in accordance with the invention that overcomes various problems of the prior art may include an anode 102, a cathode 104, an electrolyte separator/membrane 106, and an aqueous catholyte layer 108 interposed between the electrolyte membrane 106 and the cathode 104. Optionally, the battery 100 may also include a non-aqueous, organic anolyte layer 110 interposed between the anode 102 and the electrolyte membrane 106. In other embodiments, the anolyte layer 110 may be omitted by placing the anode 102 in direct contact with the electrolyte membrane 106. Current collectors 111, 113, such as metal screens or meshes, may be placed in contact with or be embedded within the anode 102 and cathode 104, respectively, to conduct electrical current to and from the anode 102 and cathode 104.

The anode 102 may contain an alkali metal (or alloys or compounds thereof) such as lithium, sodium, potassium, or the like, where it may be oxidized to produce alkali-metal ions upon discharge of the battery 100. These alkali-metal ions may travel through the electrolyte separator/membrane 106 and the aqueous catholyte layer 108 until they reach the cathode 104. At or near the cathode 104, or in the catholyte 108, the alkali-metal ions may combine with peroxide or hydroxyl ions, generated at the cathode 104, where they may combine to form one or more reaction products, such as alkali-metal oxides or hydroxides. To prevent these reaction products from precipitating, building up, and clogging the pores of the reaction layer 114, the aqueous catholyte 108 may be used to store the reaction products as solutes dissolved in the aqueous catholyte 108. This is one significant advantage of using an aqueous catholyte 108 in combination with the impermeable electrolyte membrane 106. By contrast, conventional metal-air batteries typically utilize non-aqueous organic electrolytes in which the reaction products are insoluble. Although the much higher solubility of these reaction products in aqueous electrolyte is beneficial over the prior art, there is nothing to prevent allowing the discharge of the anode to take place to the point where hydrates and precipitates of alkali metal oxides and hydroxides form in the catholyte. This may be desirable to achieve higher specific energy and energy density.

In certain embodiments, the cathode 104 may include a gas-diffusion layer 112 and a reaction layer 114. The gas-diffusion layer 112 may be gas-permeable but hydrophobic. Thus, the gas-diffusion layer 112 may allow oxygen gas to diffuse through the layer 112 in a direction 116, while preventing the aqueous catholyte 108 from diffusing through the layer 112 in the opposite direction. The reaction layer 114, on the other hand, may be permeable to the aqueous catholyte 108 (i.e., the layer 114 is hydrophilic) as well as oxygen passing through the gas-diffusion layer 112. In selected embodiments, the reaction layer 114 may contain or be infiltrated with a catalyst material, such as a perovskite compound, or other material known by those skilled in the art to serve such purpose such as manganese, cobalt and oxides thereof, to aid in reducing the oxygen and/or forming hydroxyl ions. In other embodiments, the reaction layer 114 may also include an oxygen evolution catalyst to make the battery 100 rechargeable.

Because the alkali metal of the anode 102 may react violently with water, and therefore be destroyed by water, the electrolyte membrane 106 may be a structure that is conductive to the alkali-metal ions but impermeable to the water of the catholyte layer 108. In selected embodiments, the electrolyte membrane 106 may also be a multi-layer structure. For example, in certain embodiments, the electrolyte membrane 106 may include a thin (e.g., 20 to 300 μm) dense inner layer 118, sandwiched between porous, lower density outer layers 120. In certain embodiments, the dense layer 118 may form the actual membrane 106 that is ionically conductive but water impermeable. The porous layers 120, on the other hand, may provide structural strength and rigidity to the dense layer 118 to keep it from breaking or cracking. In certain embodiments, the porous layers 120 may be infiltrated with the aqueous catholyte 108 and non-aqueous anolyte 110, respectively, to provide ionic conductivity between the dense layer 118 and the catholyte 108 and anolyte 110 respectively.

As mentioned, an alkali metal such as lithium or sodium metal may be used as the anode 102 with a metal current collector 113, such as a copper mesh or screen, connected to or embedded within the anode 102. In certain embodiments, the alkali-metal anode 102 may be placed in direct contact with the solid electrolyte membrane 106. However, this may require verifying that the electrolyte membrane 106 is stable when in contact with the alkali-metal anode 102.

Alternatively, an ionically conductive liquid electrolyte (i.e., anolyte 110) which is conductive to the alkali metal at room temperature may be placed between the alkali metal anode 102 and the solid electrolyte membrane 106. Such electrolytes may be made, for example, by mixing Lewis acid $AlCl_3$ with $CH_3SO_2Cl/LiCl$ or with $Cl_3P=NPOCl_2/LiCl$, for a lithium-air battery, or with $CH_3SO_2Cl/NaCl$ or with $Cl_3P=NPOCl_2/NaCl$ for a sodium-air battery. These electrolytes typically have room temperature conductivities of approximately 1.0 to 2.5 Siemens/cm and exhibit electrochemical stability windows of 4.5 to 5.0 volts vs. $Li+/Li$ or $Na+/Na$ respectively. In the case of Li metal, greater than 60 cycles above 80 percent expected capacity has been demonstrated with a $Li/LiMn_2O_4$ battery using this electrolyte.

In other embodiments, the anolyte 110 may include organic liquids such as propylene carbonate, dioxolane, ethylene carbonate tetraethyleneglycol dimethylether (Tetraglyme), or room-temperature ionic-liquid, 1-hexyl-3-methylimidazolium bis(perfluoroethylsulfonyl)imide ($C_6mimBeti$) or mixtures thereof. The anolyte 110 may also include various lithium or sodium salt(s) and a solvent such as dimethyl carbonate (DMC), diethylcarbonate (DEC), dipropylcarbonate (DPC), ethylmethylcarbonate (EMC), ethylene carbonate (EC), propylene carbonate (PC), butylene carbonate, lactones, esters, glymes, sulfoxides, sulfolanes, lithium perchlorate, polyethylene oxide (PEO) or polyacrylnitrile (PAN) with lithium trifluoromethylsulfonate, lithium hexafluorophosphate, or mixtures thereof.

As mentioned, the cathode 104 may include a gas-diffusion layer 112 and a reaction layer 114. One such cathode 104, for example, is described in U.S. Pat. No. 7,259,126 entitled "Gas Diffusion Electrode and Catalyst for Electrochemical Oxygen Reduction and Method of Dispersing the Catalyst," which is herein incorporated by reference. In certain embodiments, the reaction layer 114 may include Teflon, an oxygen reduction perovskite electrocatalyst, and hydrophilic carbon. In certain embodiments, the electrocatalyst of the reaction layer 114 may include a $NdCaMnFeO_3$ or $La_{0.6}Ca_{0.4}CoO_3$ perovskite. These electrocatalysts enable facile one-step reduction of oxygen to hydroxyl ions and exhibit negligible overpotential even at high cathodic current densities. The gas-diffusion layer 112, on the other hand, may contain a higher amount of Teflon and hydrophobic carbon. In certain embodiments, the gas-diffusion layer 112 may be produced by hot pressing Teflon and hydrophobic carbon powders onto a metal screen, such as a nickel screen.

In certain embodiments, the catholyte layer 108 may include a separator material, such as a cellulose separator material, soaked in an aqueous electrolyte that is conductive to the alkali metal ions produced at the anode 102. For example, the catholyte layer 108 of a sodium-air battery may include a cellulose separator material soaked in aqueous NaOH. Similarly, the catholyte layer 108 of a lithium-air battery may include a cellulose separator material soaked in aqueous LiOH. In general, the catholyte layer 108 may include absorbent materials soaked in aqueous solutions containing alkali-metal salts such as dissolved alkali-metal hydroxide, chloride, carbonate, perchlorate, hexafluorophosphate, trifluoromethylsulfonate, nitrate, or the like. The catholyte solvent, in selected embodiments, may include aqueous mixtures of ethanol, methanol, propanol, isopropanol, and the like.

As mentioned, the electrolyte membrane 106 may, in certain embodiments, include a NaSICON or LiSICON solid electrolyte membrane 106 (depending on the anode material) that is ionically conductive but impermeable to water. Most types of NaSICON and LiSICON are impermeable to water if they are fabricated with sufficient density. Ideally, the NaSICON or LiSICON is selected to maximize ionic conductivity. In certain embodiments, a suitable NaSICON membrane 106 may be produced by Ceramatec, Inc. of Salt Lake City, Utah. The Ceramatec NaSICON membrane 106 is based on a sodium-metal-phosphate structure $(Na_{1+x}Zr_2X_y(PO_4)_3)$ wherein x is between 0 and 3 and X is a proprietary dopant. The Ceramatec NaSICON offers excellent moderate temperature $Na^+$ ion conductivity of approximately $9\times10^{-2}$ Siemens/cm at 60° C. These NaSICON membranes 106 are excellent sodium-ion conductive and chemically stable and were originally developed for salt splitting and electrodialysis applications.

The NaSICON membrane 106 described above can be formed with a thickness of less than 10 μm using a tape casting approach, which is much thinner than conventional polymer or liquid-filled porous separator membranes. An ultra-thin electrolyte membrane 106 may provide considerable savings in terms of volume and mass of the battery 100, if of course the reduced thickness is not offset by a need for a thick inactive support material. Another advantage of using this type of membrane 106 is that the materials used to produce solid inorganic electrolytes are generally single ionic conductors. This may reduce or eliminate anionic concentration gradient across the electrolyte membrane 106 and may help to suppress undesirable side reactions or decomposition of the electrolyte. This may also expand the available choices for electrode materials and permit the battery 100 to operate at higher voltages.

A solid electrolyte membrane 106 further has the advantage that it provides a dense, hard surface that can maintain its integrity and inhibit roughening of the microstructure. This may reduce mossy or dendritic deposits that may increase the resistivity of the membrane 106 over time. A NaSICON membrane 106 also is not influenced by scaling or precipitation of divalent, trivalent, tetravalent ions or dissolved solids and does not degrade in the presence of corrosive elements like sodium. The NaSICON membrane 106 can is best operated over pH range from neutral to caustic (e.g., 7 to 14) and selectively transport sodium ions in the presence of other ions at very high electrical efficiency (greater than 95 percent).

Where a lithium ion conductor is required to produce a lithium-air battery, the electrolyte membrane 106 may include a material having the formula $Li_{1+x}M_xTi_{2-x}(PO_4)_3$ where $0 \leq x \leq 1.5$ and where M is Al, Zr, Sn, Hf, Y, or mixtures thereof. In other embodiments, the electrolyte membrane 106 may include a material having the formula $Li_{1+x}M_xM''_{2-x}(PO_4)_{3-y}(M'O_4)_y$, where $0 \leq x \leq 1.5$; $0 \leq y \leq 3$; M is Al, Y, Ti, or mixtures thereof; M'' is Zr, Sn, Si, Ti, Hf; and M' is Si, Nb, or Ge, or mixtures thereof. In other embodiments, an ionically conductive ceramic membrane 106 may include a material having the formula $Li_{1+x}Zr_2Si_xP_{3-x}O_{12}$ where $0 \leq x \leq 3$. In yet other embodiments, an ionically conductive ceramic membrane 106 may include a non-stoichiometric lithium-deficient material having the formula $(Li_5RESi_4O_{12})_{1-\delta}(RE_2O_3 2SiO_2)_\delta$, where RE is Y, Nd, Dy, Sm, or a mixture thereof and where δ is the measure of deviation from stoichiometry, which may vary between about 0 and 1.

Figure 2:
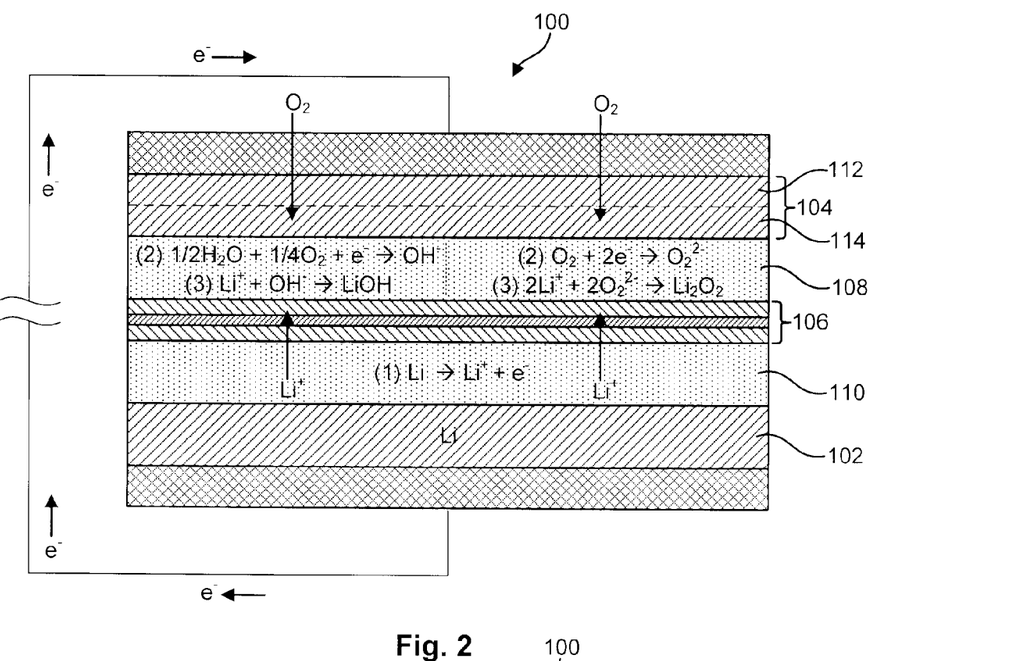
FIG. 2 is a high-level block diagram showing one embodiment of a lithium-air battery in accordance with the invention.

Referring to FIG. 2, one example of a metal-air battery 100 using lithium as the anode material is illustrated. As shown, lithium may be reduced at the anode 102 to produce lithium ions. These lithium ions may travel through the anolyte 110, electrolyte membrane 106, and catholyte 108, until they reach the cathode 104. Meanwhile, at the cathode 104, oxygen may pass through the gas-diffusion layer 112 to the reaction layer 114, where electrons, oxygen, and water may react to generate peroxide and hydroxyl ions. At the reaction layer 114, or in the catholyte 108, the peroxide and hydroxyl ions may react with the lithium ions to form one or more of lithium hydroxide (as illustrated by the chemical reactions on the left) and lithium peroxide (as illustrated by the chemical reactions on the right).

In general, lithium hydroxide may be generated in the lithium-air battery 100 according to the following equations:

Anode/organic anolyte: $Li \rightarrow Li^+ + e^-$ (1)

Cathode/aqueous catholyte: $0.5H_2O + 0.25O_2 + e^- \rightarrow OH^-$ (2)

Cathode/aqueous catholyte: $Li^+ OH^- \rightarrow LiOH$ (3)

Similarly, lithium peroxide may be generated in the lithium-air battery 100 according to the following equations:

Anode/organic anolyte: $Li \rightarrow Li^+ + e^-$ (1)

Cathode/aqueous catholyte: $O_2 + 2e^- \rightarrow O_2^{2-}$ (2)

Cathode/aqueous catholyte: $2Li^+ + 2O_2^{2-} \rightarrow Li_2O_2$ (3)

As mentioned above, because the metal-air battery 100 uses an aqueous catholyte 108, the lithium hydroxide and lithium peroxide generated according to the above equations may be stored as solutes dissolved in the aqueous catholyte 108 to a large extent before starting to form hydrates.

Figure 3:
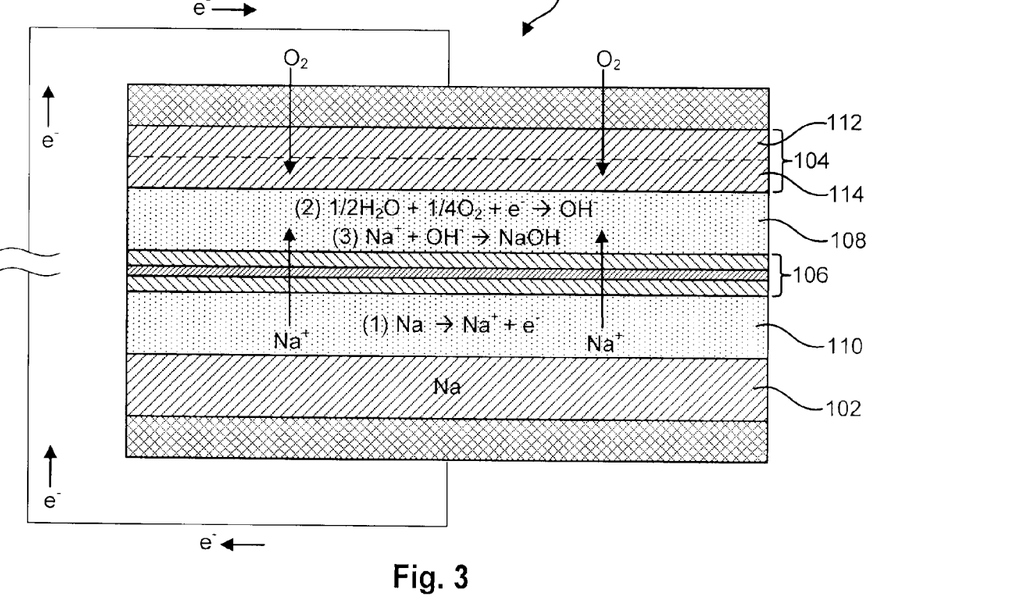
FIG. 3 is a high-level block diagram showing one embodiment of a sodium-air battery in accordance with the invention.

Referring to FIG. 3, another example of a metal-air battery 100 using sodium as the anode material is illustrated. As shown, sodium in the anode 102 may be reduced to produce sodium ions. These ions may be conducted through the anolyte 110, electrolyte membrane 106, and catholyte 108, until they reach the cathode 104. Meanwhile, at the cathode 104, oxygen may pass through the gas-diffusion layer 112 to the reaction layer 114, where electrons, oxygen, and water may react to form peroxide and/or hydroxyl ions. At the reaction layer 114, or in the catholyte 108, the peroxide and/or hydroxyl ions may react with the sodium ions to form sodium hydroxide.

In general, sodium hydroxide may be generated in the sodium-air battery 100 according to the following equations:

Anode/organic anolyte: $Na \rightarrow Na^+ + e^-$ (1)

Cathode/aqueous catholyte: $0.5H_2O + 0.25O_2 + e^- \rightarrow OH^-$ (2)

Cathode/aqueous catholyte: $Na^+ + OH^- \rightarrow NaOH$ (3)

The sodium hydroxide generated above may be stored as a solute dissolved in the aqueous catholyte 108 to a large extent prior to forming hydrates.

Although lithium may theoretically produce a battery 100 with significantly higher energy density than sodium, sodium may become a desirable choice because of its higher solubility in water. For example, as indicated by Table I below, lithium may have a free energy of reaction and theoretical voltage that is higher than sodium. Because lithium is much lighter than sodium, lithium by itself has a much higher energy density than sodium (13308 W-hr/kg for lithium compared to 3632 W-hr/kg for sodium, a difference of 9676 W-hr/kg).

Nevertheless, when considering the water that is consumed in the reaction, and then needed to maintain performance of the cathode, the overall performance of the sodium-air battery begins to approach or exceed the performance of the lithium-air battery. For example, once water is taken into account, the specific energy of the sodium-air battery is 2609 W-hr/kg and the specific energy of the lithium-air battery is 5792 W-hr/kg, a difference of 3183 W-hr/kg. When the oxygen consumed by the reaction is considered, the specific energy of the sodium-air battery is 2088 W-hr/kg and the specific energy of the lithium-air battery is 3857 W-hr/kg, a difference of only 1769 W-hr/kg.

The sodium-air battery significantly outperforms the lithium-air battery when the water needed to dissolve the reaction products is taken into account. As shown in Table I, the solubility of sodium hydroxide (i.e., 103) in water is far greater than the solubility of lithium hydroxide (i.e., 12.8). As a result, significantly less water is needed in the aqueous catholyte 108 of the sodium-air battery compared to the lithium-air battery to dissolve the reaction products. When considering the added weight of the water, the energy density of the sodium-air battery (1304 W-hr/kg) is significantly greater than the energy density of the lithium-air battery (455 W-hr/kg).

In practice, both systems can be operated to higher specific energies by allowing some alkali hydroxide hydrate to form which can be tolerated to some extent while still maintaining cathode performance.

TABLE I

Expected Energy Density Calculations for $Li/O_2$ and $Na/O_2$ batteries

| Characteristics | $Li/O_2$ Battery | $Na/O_2$ Battery |
|---|---|---|
| Free energy of reaction ($\Delta Gr$) | −79.5 | −71.8 |
| Number of electrons (n) = | 1 | 1 |
| Voltage (V) = | 3.4 | 3.1 |
| M (W-hr/kg) | 13308 | 3632 |
| M + $0.5H_2O$ (W-hr/kg) | 5792 | 2609 |
| M + $0.5H_2O$ + $0.25O_2$ (W-hr/kg) | 3857 | 2088 |
| Solubility of MOH in water at 20 C (g/100 cc) | 12.8 | 103 |
| M + $0.5H_2O$ + $0.25O_2$ + Water for Dissolution (W-hr/kg) | 438 | 1172 |
| M + $0.5H_2O$ + Water for Dissolution (W-hr/kg) | 455 | 1304 |

Figure 4:
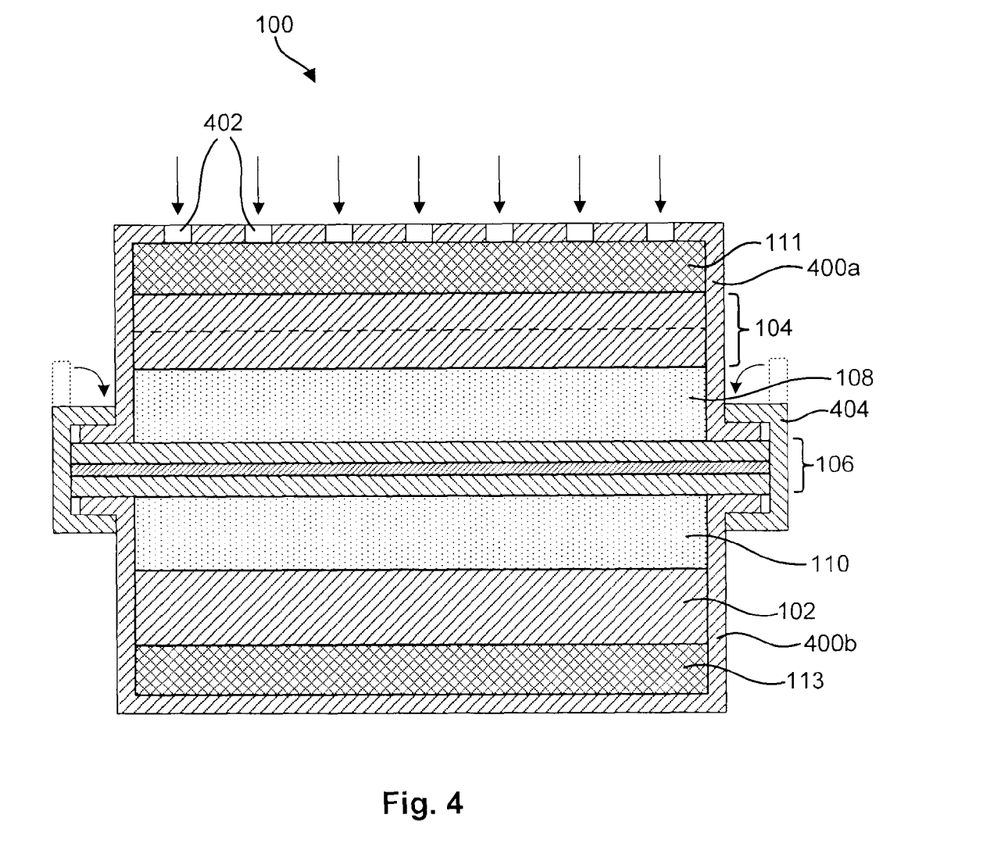
FIG. 4 is a high-level block diagram showing one embodiment of a physical implementation of a metal-air battery in accordance with the invention.

Referring to FIG. 4, in certain embodiments, a physical implementation of a metal-air battery 100 in accordance with the invention may include an electrically conductive housing 400a, 400b divided into two electrically isolated halves 400a, 400b, such as stainless steel halves 400a, 400b. One half 400b may contain the alkali-metal anode 102, a current collector 113 (e.g., a copper screen) connected to or embedded within the anode 102, and the anolyte layer 110. The other half 400a may contain the cathode 104, a current collector 111 (e.g., a nickel screen) connected to or embedded within the cathode 104, and the catholyte layer 108. In selected embodiments, the anolyte layer 110 is a separator material, such as a polypropylene non-woven separator, soaked in an anolyte solution. Similarly, the catholyte layer 108 may include a separator soaked in a catholyte solution, such as a cellulose separator soaked in a metal hydroxide solution.

In certain embodiments, the electrolyte membrane 106 may be sandwiched between the two halves 400a, 400b to seal and isolate the anolyte and catholyte compartments and to electrically isolate the first half 400a from the second half 400b. In certain embodiments, a plastic or elastomeric grommet or other suitable material may be used to seal the two halves 400a, 400b to the electrolyte membrane 106. An electrically insulating clamping device 404, such as a clip, band, crimp, or the like, may be used to clamp the halves 400a, 400b to the membrane layer 106 and hold the halves 400a, 400b together. In certain embodiments, openings 402 may be formed in the half 400a to allow oxygen to flow to the cathode 104 from the surrounding environment.

Figure 5:
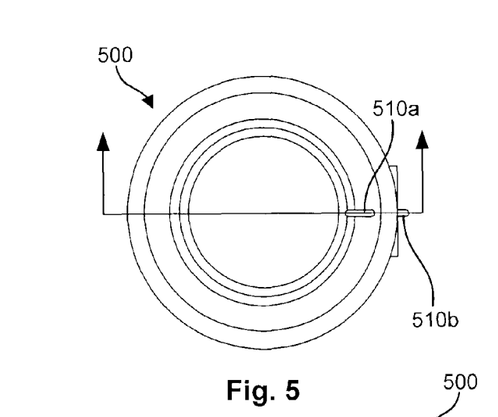
FIG. 5 is a top view of one embodiment of a metal-air battery in accordance with the invention in the form of a pouch cell.
Figure 6:
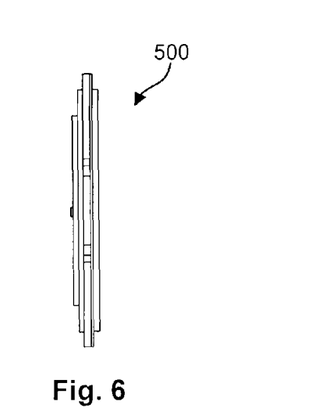
FIG. 6 is a side view of the pouch cell illustrated in FIG. 5.
Figure 7:
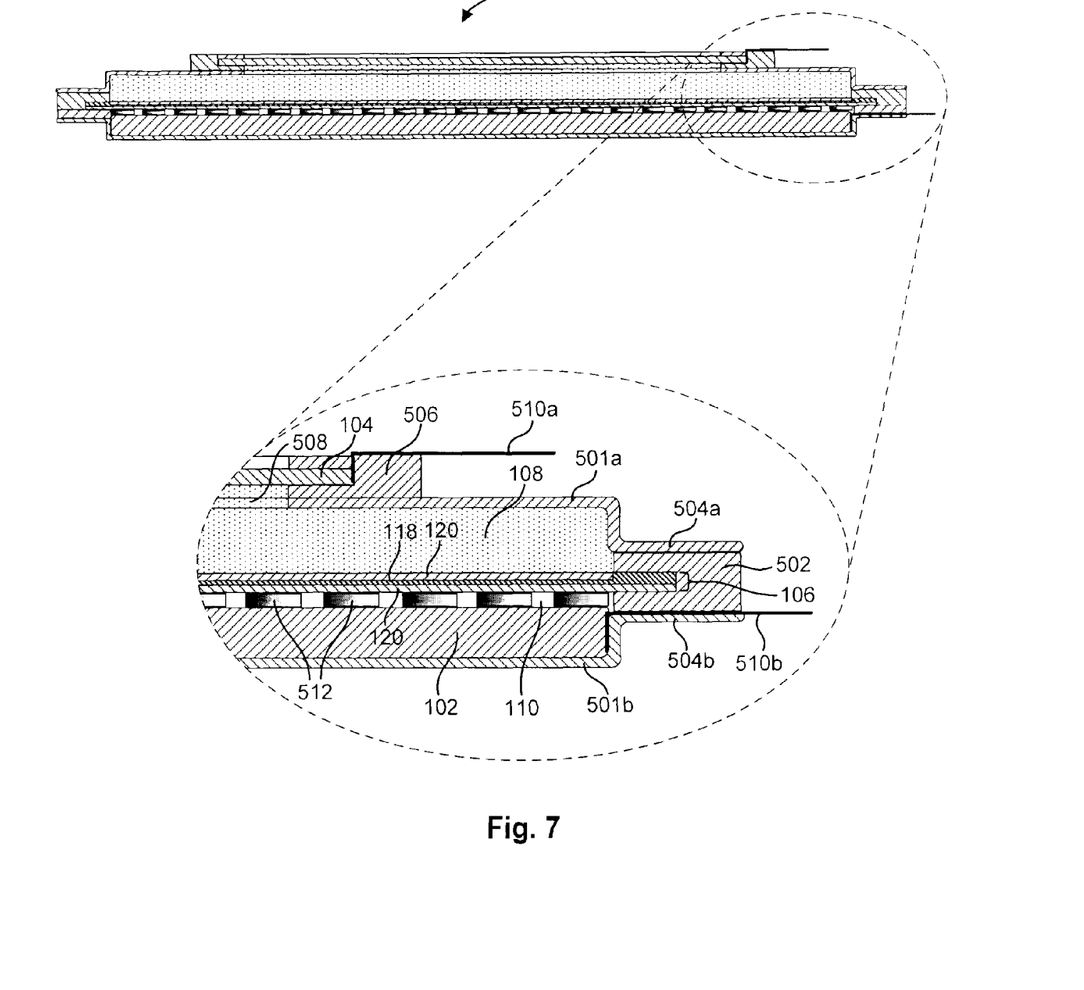
FIG. 7 is a cutaway side view of the pouch cell illustrated in FIG. 5.

Referring to FIGS. 5 through 7, in selected embodiments in accordance with the invention, the battery 100 may be designed in the form of a pouch cell 500. The pouch cell 500 may achieve higher energy densities than ordinary cells by efficiently using space. The pouch cell 500 may also facilitate stacking and/or wiring the cells 500 in serial or parallel configurations to provide a battery 100 with desired voltage and current characteristics. Although the illustrated pouch cell 500 has a circular shape, the pouch cell 500 may also be designed to have a rectangular shape to maximize space utilization in a rectangular housing.

As shown, in selected embodiments, the pouch cell 500 may include an electrically insulating outer shell or housing 501a, 501b such as a polyethylene housing 501a, 501b. Like the previous example, the housing 501a, 501b may, in selected embodiments, be divided into two halves 501a, 501b, with one half 501a housing the catholyte 108 and the other half 501b housing the anode 102 and the anolyte layer 110. The electrolyte membrane 106, which in this example includes a dense layer 118 sandwiched between two porous layers 120, may separate the catholyte and anolyte compartments 108, 110. In certain embodiments, a series of standoffs 512 may be used to create space between the anode 102 and the membrane 106 to accommodate the anolyte 110.

In selected embodiments, an electrically insulating support ring 502, or clamp 502, such as a polyethylene ring, may be bonded and sealed to an outer circumference of the membrane 106. This support ring 502 may then be clamped, bonded, and sealed to flanges 504a, 504b of the housing 501a, 501b to provide an effective seal with the membrane 106 and seal the catholyte and anolyte compartments 108, 110. Similarly, in selected embodiments, a support ring 506, or clamp 506, such as a polyethylene ring, may be positioned and bonded to an outer circumference of the cathode 104. This ring 506 may also be bonded to the top of the housing 501a.

A bottom side of the cathode 104 may communicate with the catholyte 108 through an opening 508 in the housing 501a and a top side of the cathode 104 may communicate with an oxygen source. Electrically conductive tabs 510a, 510b may be electrically connected to current collectors 111, 113 (not shown) which may be connected to or embedded within the anode 102 and cathode 104, respectively.

Figure 8:
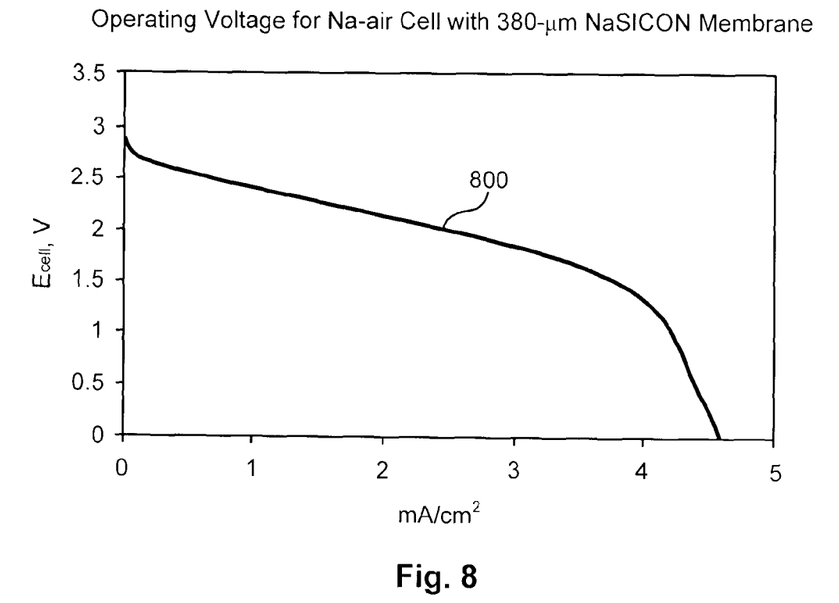
FIG. 8 is a graph showing the operating voltage of a sodium-air battery in accordance with the invention as a function of current density.

Referring to FIG. 8, a polarization curve 800 showing the operating voltage of one embodiment of a non-optimized, sodium-air pouch cell, as a function of current density, is illustrated. In this example, the cell utilizes a dense NaSICON electrolyte membrane 118 with a thickness of approximately 380 μm. Ideally, the thickness of the membrane 118 and the volume of the catholyte 108 will be further reduced to decrease the polarization of the cell. This will flatten out the curve 800 and provide improved current/voltage characteristics.

As shown, the polarization curve 800 of the sodium-air cell 100 exhibits a predominantly linear region when the current density is between about 0 and 4 $mA/cm^2$, while delivering between about 2.7 and 1.5 volts. The voltage drops off significantly after the current density exceeds 4 $mA/cm^2$. Thus, the cell is only viable at current densities that are less than about 4 $mA/cm^2$; however, with further optimization, much higher current densities are expected to be viable and with desirable voltage potential.

Figure 9:
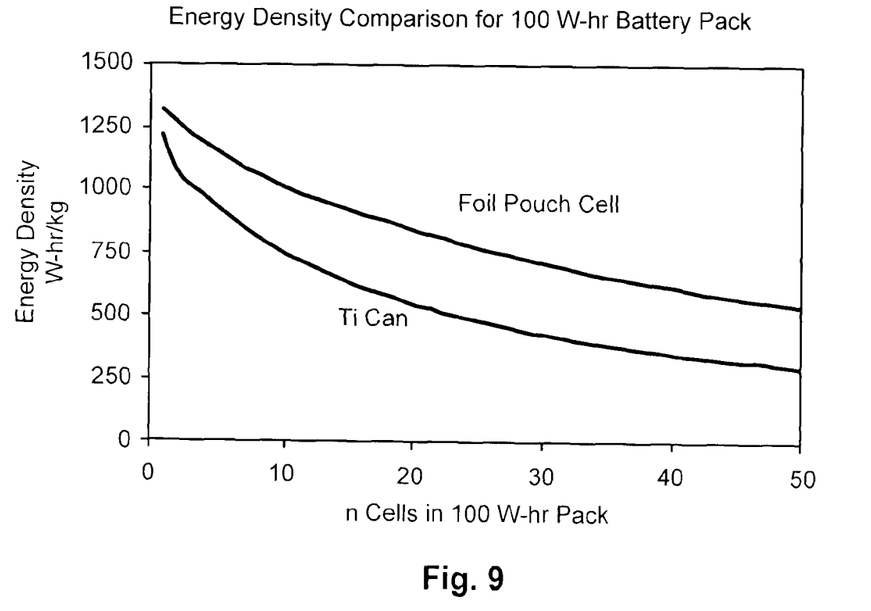
FIG. 9 is a graph comparing the energy density of a 100 W-hr battery pack using a foil pouch cell design and a 100 W-hr battery pack using a titanium can cell design.

Referring to FIG. 9, a graph comparing the energy density of a 100 W-hr battery pack using a foil pouch cell and a 100 W-hr battery pack using a titanium can cell is illustrated. The energy density of each type of battery is calculated as a function of the number of cells in the battery pack. As shown, the battery pack that uses the pouch cells has a higher energy density than the battery pack that uses the titanium cans for any number of cells in the battery pack. This is due to the pouch cell's more efficient use of space and materials. Nevertheless, the energy density differential may increase significantly as the number of cells in the battery pack increases. For example, the energy density of the battery pack using the pouch cells exceeds the energy density of the battery pack using the titanium cans by only about 20 percent where there are few cells (e.g., 0 to 10 cells). However, the energy density of the battery pack using the pouch cells exceeds the energy density of the battery pack using the titanium cans by approximately 50 percent when the number of cells approaches 50 cells. Thus, it becomes increasingly advantageous to use a foil pouch cell design when multiple cells are wired together.

The present invention may be embodied in other specific forms without departing from its basic principles or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. An air-metal battery comprising:
    a cathode comprising a gas-diffusion layer that is hydrophobic but permeable to oxygen, and a reaction layer comprising one or more catalysts to reduce oxygen molecules during battery discharge and to produce oxygen molecules during battery recharge;
    an alkali-metal-containing anode which is oxidized to produce alkali-metal ions;
    an aqueous catholyte in ionic communication with the cathode;
    a ion-selective membrane interposed between the alkali-metal containing anode and the aqueous catholyte, the ion-selective membrane being conductive to the alkali-metal ions while being impermeable to the aqueous catholyte;
    an anolyte interposed between the alkali-metal-containing anode and the ion-selective membrane to conduct the alkali-metal ions; and
    wherein the ion-selective membrane comprises a dense layer, impermeable to the aqueous catholyte, sandwiched between porous layers, wherein the porous layers comprise a material that is ion-selective and conductive to the alkali-metal ions.

2. The air-metal battery of claim 1, wherein the porous layers provide strength and rigidity to the dense layer.

3. The air-metal battery of claim 1, wherein the porous layers are infiltrated with the anolyte and catholyte, respectively.

4. The air-metal battery of claim 1, wherein the one or more catalysts comprises a perovskite compound.

5. The air-metal battery of claim 1, wherein the one or more catalysts comprises manganese, cobalt or oxides thereof.

6. The air-metal battery of claim 1, wherein the alkali metal comprises at least one of Li, Na, and K.

7. The air-metal battery of claim 1, wherein the ion-selective membrane comprises at least one of LiSICON and NaSICON.

8. The air-metal battery of claim 1, wherein the aqueous catholyte is a separator material soaked in an aqueous catholyte solution.

9. The air-metal battery of claim 1, wherein the dense and porous layers comprise the same alkali-metal ion conductive material.

10. A method for discharging and recharging an air-metal battery comprising:
    oxidizing an alkali-metal-containing anode to produce alkali-metal ions;
    transporting the alkali-metal ions through an anolyte interposed between the anode and an ion-selective membrane;
    transporting the alkali-metal ions through an ion-selective membrane that is impermeable to water, wherein transporting the alkali-metal ions through an ion-selective membrane comprises transporting the alkali-metal ions through a dense layer, impermeable to the aqueous catholyte, sandwiched between porous layers, wherein the porous layers comprise a material that is ion-selective and conductive to the alkali-metal ions;
    transporting the alkali-metal ions through an aqueous catholyte solution;
    reducing oxygen molecules at a cathode to produce oxygen containing anions, wherein the cathode comprises a gas-diffusion layer that is hydrophobic but permeable to oxygen and a reaction layer containing one or more catalysts to reduce oxygen molecules during battery discharge and to produce oxygen molecules during battery recharge;
    reacting the alkali-metal ions with the oxygen containing anions generated at the cathode to produce a reaction product; and
    storing the reaction product as a solute dissolved in the aqueous catholyte solution.

11. The method of claim 10, wherein the porous layers provide strength and rigidity to the dense layer.

12. The method of claim 10, wherein the porous layers are infiltrated with the anolyte and catholyte, respectively.

13. The method of claim 10, wherein the one or more catalysts comprises a perovskite compound.

14. The method of claim 10, wherein the one or more catalysts comprises manganese, cobalt or oxides thereof.

15. The method of claim 10, wherein the alkali-metal ions comprise at least one of Li, Na, and K ions.

16. The method of claim 10, wherein the ion-selective membrane comprises at least one of LiSICON and NaSICON.

17. The method of claim 10, wherein transporting the alkali-metal ions through an aqueous catholyte solution comprises transporting the alkali-metal ions through a separator material soaked in an aqueous catholyte solution.

18. The air-metal battery of claim 10, wherein the dense and porous layers comprise the same alkali-metal ion conductive material.

19. An air-metal battery comprising:
    a cathode comprising a gas-diffusion layer that is hydrophobic but permeable to oxygen, and a reaction layer comprising one or more catalysts to reduce oxygen molecules during battery discharge to produce oxygen containing anions and to produce oxygen molecules during battery recharge;
    an alkali-metal-containing anode which is oxidized to produce alkali-metal ions;
    a catholyte solution in ionic communication with the cathode to conduct the alkali-metal ions and store, in the form of a dissolved solute, a reaction product produced by reacting the oxygen containing anions with the alkali-metal ions; and
    an ion-selective membrane interposed between the alkali-metal containing anode and the catholyte solution, the ion-selective membrane being conductive to the alkali-metal ions while being impermeable to the catholyte solution, wherein the ion-selective membrane comprises a dense layer, impermeable to the catholyte solution, sandwiched between porous layers, wherein the dense and porous layers comprise a material that is ion-selective and conductive to the alkali-metal ions.

20. The air-metal battery of claim 19, wherein the dense and porous layers comprise the same alkali-metal ion conductive material.

* * * * *